US008862608B2

(12) United States Patent
Bhalotia et al.

(10) Patent No.: US 8,862,608 B2
(45) Date of Patent: Oct. 14, 2014

(54) INFORMATION RETRIEVAL USING CATEGORY AS A CONSIDERATION

(75) Inventors: Gaurav Bhalotia, Fremont, CA (US); John Patrick Adams, Stanford, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 1091 days.

(21) Appl. No.: 12/110,246

(22) Filed: Apr. 25, 2008

(65) Prior Publication Data

US 2009/0125505 A1    May 14, 2009

Related U.S. Application Data

(60) Provisional application No. 60/987,620, filed on Nov. 13, 2007.

(51) Int. Cl.
*G06F 17/30* (2006.01)
(52) U.S. Cl.
CPC .... *G06F 17/30864* (2013.01); *G06F 17/30707* (2013.01); *G06F 17/30734* (2013.01)
USPC .................... 707/766; 707/765; 707/E17.018
(58) Field of Classification Search
CPC .................... G06F 17/30864; G06F 17/30867; G06F 17/3053; G06F 17/3064; G06F 17/3097; G06F 17/30289; G06F 17/30734; G06F 11/2094; G06F 17/30395; G06F 17/30705; G06F 17/30884; G06F 17/30126; G06F 17/3026
USPC ................................................ 707/766, 765
See application file for complete search history.

(56) References Cited

U.S. PATENT DOCUMENTS

| | | | |
|---|---|---|---|
| 6,112,203 A | 8/2000 | Bharat et al. |
| 6,285,999 B1 | 9/2001 | Page |
| 6,507,843 B1 | 1/2003 | Dong et al. |
| 6,691,163 B1 | 2/2004 | Tufts |
| 6,982,708 B1 | 1/2006 | Mah et al. |
| 6,990,628 B1 | 1/2006 | Palmer et al. |
| 7,013,300 B1 | 3/2006 | Taylor |
| 7,072,846 B1 | 7/2006 | Robinson |
| 7,080,073 B1 | 7/2006 | Jiang et al. |

(Continued)

OTHER PUBLICATIONS

Borodin et al., Finding Authorities and Hubs From Link Structures on the World Wide Web, In Proceedings of the Tenth International World Wide Web Conference, Jan. 18, 2002.
Taher H. Haveliwala, Topic-Sensitive PageRank: A Context-Sensitive Ranking Algorithm for Web Search, In Proceedings of the Eleventh International World Wide Web Conference, 2002.

(Continued)

*Primary Examiner* — Shyue Jiunn Hwa
(74) *Attorney, Agent, or Firm* — David R. Stevens; Stevens Law Group

(57) ABSTRACT

Category affinity may be used as a consideration in providing search results. A taxonomy of substantive categories is created and/or obtained. A corpus of document is compared with the taxonomy to determine the category(ies) with which the documents affine. A query is also compared with the taxonomy to determine the category(ies) with which the query affines. A document may receive a category score based on how well the document's category(ies) match the query's category(ies). This document score may be combined with other scores, such as a text score, a link score, and a distance score, and/or any other factors, to determine an overall relevance score. The relevance score may then be used to rank and present search results.

16 Claims, 5 Drawing Sheets

(56) References Cited

U.S. PATENT DOCUMENTS

| | | | |
|---|---|---|---|
| 7,133,870 B1 | 11/2006 | Tripp et al. | |
| 7,231,405 B2 | 6/2007 | Xia | |
| 7,788,265 B2 | 8/2010 | Morscher et al. | |
| 8,396,864 B1 * | 3/2013 | Harinarayan et al. | 707/722 |
| 8,429,167 B2 | 4/2013 | Taylor | |
| 2003/0212691 A1 | 11/2003 | Kuntala et al. | |
| 2004/0044962 A1 | 3/2004 | Green et al. | |
| 2004/0193698 A1 | 9/2004 | Lakshminarayana | |
| 2005/0004889 A1 | 1/2005 | Bailey et al. | |
| 2005/0080795 A1 | 4/2005 | Kaupur et al. | |
| 2005/0144162 A1 * | 6/2005 | Liang | 707/3 |
| 2005/0165753 A1 | 7/2005 | Chen et al. | |
| 2005/0256832 A1 | 11/2005 | Zhang et al. | |
| 2005/0256860 A1 | 11/2005 | Eiron et al. | |
| 2006/0248031 A1 | 11/2006 | Kates et al. | |
| 2007/0192318 A1 * | 8/2007 | Ramer et al. | 707/7 |
| 2009/0024605 A1 * | 1/2009 | Yang | 707/5 |

OTHER PUBLICATIONS

Jeh et al., Scaling Personalized Web Search, In Proceedings of the Twelfth International World Wide Web Conference, 2003.

Jon M. Kleinberg, Authoritative Sources in a Hyperlinked Environment, Journal of the ACM, 1999.

Lempel et al., The Stochastic Approach for Link-Structure Analysis (SALSA) and the TKC Effect, 2000.

Ng et al., Stable Algorithms for Link Analysis, In Proceedings the Twenty-Fourth Annual International ACM SIGIR Conference, 2001.

Page et al., The PageRank Citation Ranking: Bringing Order to the Web, 1998.

Richardson et al., The Intelligent Surfer: Probabilistic Combination of Link and Content Information in PageRank, 2002.

Soumen Chakrabarti, Mining the Web: Discovering Knowledge from Hypertext Data, 2002.

\* cited by examiner

INFORMATION RETRIEVAL USING CATEGORY AS A CONSIDERATION

CROSS-REFERENCE TO RELATED CASES

This application claims the benefit of U.S. Provisional Patent Application No. 60/987,620, entitled "Kosmix Local—Category Enhanced Information Retrieval", filed Nov. 13, 2007.

BACKGROUND

Content search is normally performed based on a word search—i.e., a comparison of terms in a search query with terms in a document. Certain variations on, and/or enhancements to, the word search have been developed. For example, page-rank attempts to rate the relative importance of a web page based on existing links to the web page, and this assessment of importance can be taken into account in presenting the search results. Moreover, certain localized searches take geographic factors into account.

These existing techniques are based on the notion that a web page, or other content, can be understood primarily from the words used in the content, the number of links to the content, and/or the geographic location to which the content relates. Moreover, these techniques assume that a query can be matched to content based on keywords used in the query and/or a geographic cue associated with the query. However, a consideration of the broader context to which the query and content relate may produce different search results than these existing techniques.

SUMMARY

Search results may be generated from a query based on an assessment of one or more categories associated with the query, and an assessment of the categories associated with the corpus of documents that is being searched. A taxonomy of substantive categories may be created and/or obtained. The taxonomy may be organized as a hierarchy of categories that run from the general to the specific, such as a tree that has several levels. (A taxonomy need not be a tree. Depending on the relationships between the categories, it could be a directed acyclic graph (DAG), a generalized graph, or any other structure. It will be understood that the examples of a tree taxonomy herein may generalized to these other structures.) Each level in the tree may represent a different level of granularity in the classification of content. For example, a node at one level in the tree could be "food", a child node one level deeper could be "restaurants", and a child node one level deeper could be "pizzerias." As association is created between each node in the hierarchy and terms that relate to the category defined by that node.

An association is created between the corpus of documents to be searched (e.g., web pages, licensed content, etc.) and one or more categories in the hierarchy. (The term "documents" may comprise text content, but may also comprise other types of content, such as images, video, audio, etc.) Additionally, when a query is submitted, a determination is made as to which one or more categories the query is associated with. The corpus of documents is then compared to the query by finding content items that have some or all of the categories that are associated with the query. Additionally, the query may be compared to the corpus of documents using word-search techniques. Documents may be scored based on how well they fit the query, and independent scores may be generated based on the word search and on the category comparison, and on other criteria. The scores may be combined according to some weighting, in order to rank documents for relevancy based on a combination of their word- and category-based scores against the query. Additional factors may be used to rank documents. For example, the documents may have geographic indicia and the query may specify a geographic location, so the documents may be score based on how well they fit the specified geographic location. Additionally, existing links to the document from other documents may be taken into account in scoring the document. The relevance of the linking document to the target document may be taken into account in evaluating the relevance of the links.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Performing a search involves comparing a query to a corpus of documents. Such a search is traditionally performed based on a comparison of the words in the query with a comparison of the words in each document. This technique, often called a "word search" or "text search," presumes that the meaning or significance of the document can be found based primarily on the words used in the document. Such searches, unaided by other techniques, often turn up documents that have a high word-based correlation with the query, but that may not be relevant to what the person who enters the query is looking for. Techniques such as page-rank attempt to assess a document's importance based on the number of links to the document. While techniques like page-rank can weed out documents that the public does not find important enough to link to, these techniques do not address the problem of matching a document to a query based on the document's meaning or significance. Category-based search can assist in creating an accurate substantive match between a query and a document. (The term "documents" may comprise text content, but may also comprise other types of content, such as images, video, audio, etc. Moreover, words are an example of "features" that may be present in a document and/or a query, and on which search may be based. The subject matter herein encompasses any type of document and any type of query having any type of features.)

Figure 1:
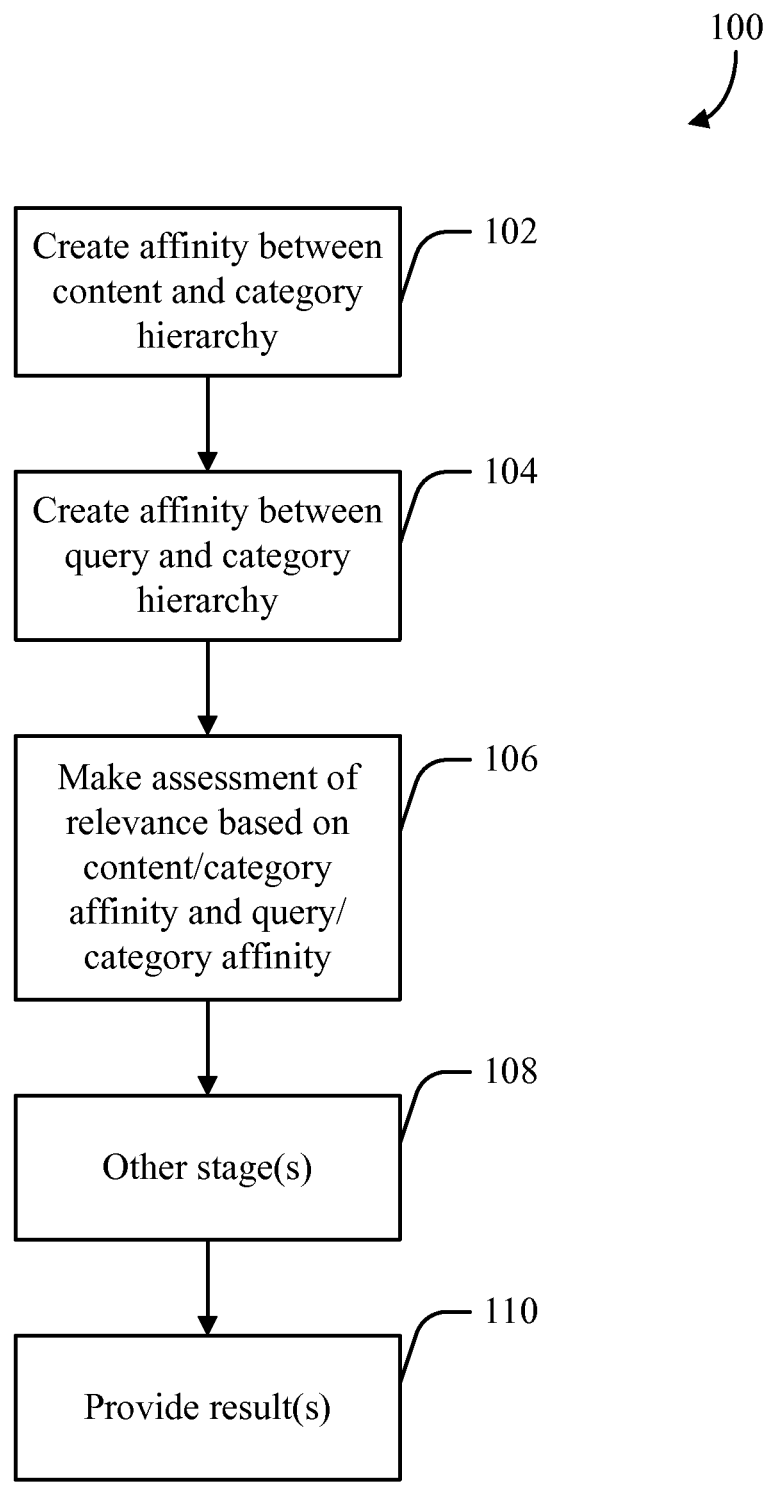
FIG. 1 is a flow diagram of an example process of determining how well the documents in a corpus of content fit with a query.
Figure 2:
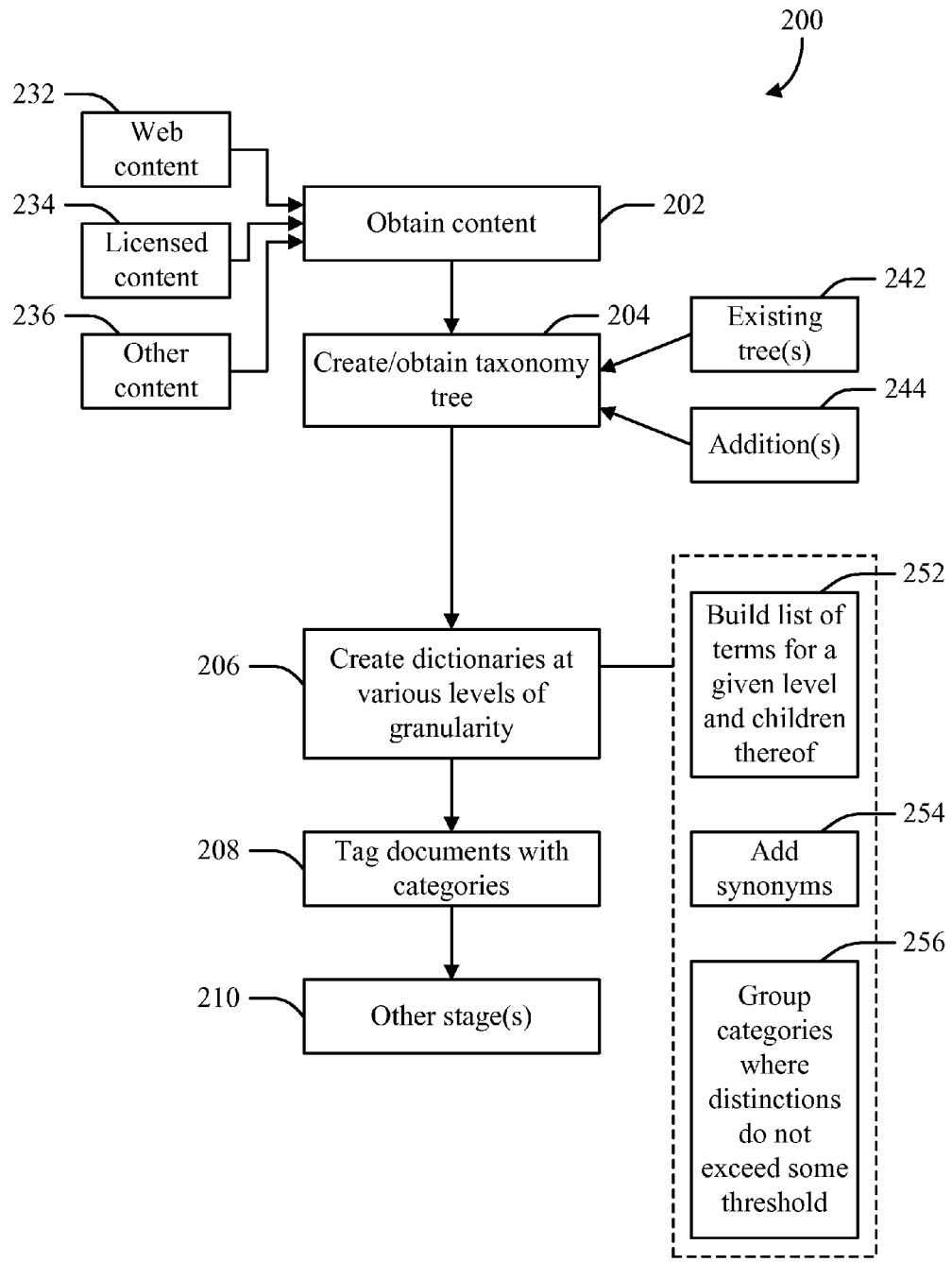
FIG. 2 is a flow diagram of an example process of creating and/or obtaining a taxonomy, and of creating affinity between categories and content.
Figure 3:
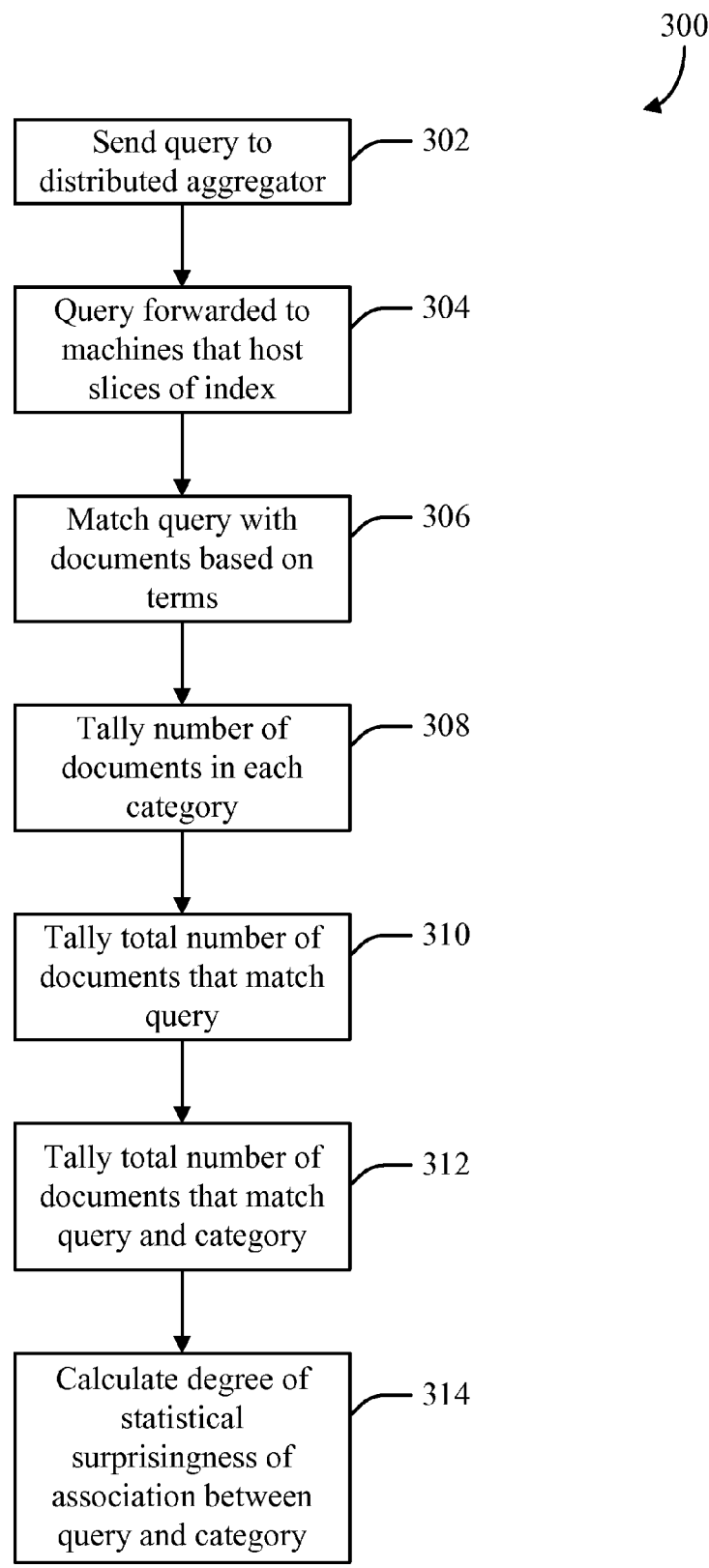
FIG. 3 is a flow diagram of an example process of creating affinity between a query and one or more categories.

Turning now to the drawings, FIG. 1 shows an example process 100 of determining how well the documents in a corpus of content fit with a query. It is noted that FIGS. 1-3 show various flow diagrams, which may be carried out with respect to the system(s) shown herein, but could also be carried out with respect to any system. Moreover, each of the flow diagrams in FIGS. 1-3 shows an example in which stages of a process are carried out in a particular order, as indicated by the lines connecting the blocks, but the various stages shown in these diagrams can be performed in any order, or in any combination or sub-combination.

At 102, affinities are created between existing content and a category hierarchy. One example of how these affinities are created is discussed below in connection with FIG. 2. However, the affinities may be created in any manner. Example details of a category hierarchy are further described below as part of the discussion of FIG. 2. However, for the purpose of 102, any type of category hierarchy (or other type of taxonomy) may be used. The creation of affinities between content and categories may take place as a back-end process that occurs before a query is actually received. Thus, the affinities may be stored when they are created, so that they are ready to use in order to process the query. However, the affinities may be created at any time.

At 104 affinities are created between a query and the category hierarchy (or other taxonomy). These affinities may be created when the query is received. One example of how these affinities are created is discussed below in connection with FIG. 3. However, the affinities may be created in any manner.

At 106, and assessment of the relevance of the various document to the query is made, based at least in part on the affinities that were created at 104 and 106. For example, the category(ies) that are affined with the query may be compared with stored content-category affinities that were created at 102, in order to determine which document appear to have the same, or similar, affinities to the query.

At 108, any other stages of process 100 may be performed. For example, a relevance score for some or all of the documents in the corpus may be created, and this relevance score may be used as part of a document ranking as discussed in connection with FIG. 4. As another example, affinities between the query and the content may be created based on geographic information. Any stage may be performed at 108.

At 110, results may be provided. For example, if document score and/or rankings are created based on category affinities, text scores, distance scores, etc. (as discussed below in connection with FIG. 4), these document scores may be used to present search results.

The subject matter described herein may make use of various indices. For example, there may be a text index that maps keywords to documents, a category index that maps categories to documents, and/or a geographic index that maps geographic locations to documents. These indices (as well as any additional indices) may be used in any combination or sub-combination. The text index may be created based on a word analysis of documents in the corpus to determine what words appear in those documents. The geographic index may map a geographic location (e.g., a zip code) to a document that relates to that zip code (e.g., a restaurant located in a particular zip code might be considered to relate to that zip code).

The category index may be created by creating and/or obtaining a taxonomy of different categories, and then creating affinities between the documents and the categories. FIG. 2 shows an example process 200 of creating and/or obtaining a taxonomy, and of creating affinity between categories and content. The process of FIG. 2 may be used to carry out 102 of process 100 (shown in FIG. 1), although process 200 may be used in any context.

At 202, content is obtained. The obtained content forms the corpus against which a query is compared. Example sources from which content may be obtained include web content 232, licensed content 234, and any other content 236. Web content 232 may be obtained by crawling the web. Licensed content 234 may be obtained from licensing sources, such as a "Yellow Pages" directory, a local business database, etc. In addition to web content 232 and licensed content 234, any other content may be obtained, and may form part of the corpus.

At 204, a taxonomy or other hierarchy (such as a tree of categories) is created and/or obtained. For example, such a taxonomy may be based on one or more existing trees 242, and may be augmented or modified by addition(s) 244. As one example, the Occupational Safety and Health Administration (OSHA) of the United States Department of Labor maintains a taxonomy of different business categories. OSHA maintains this taxonomy for regulatory purposes, but since it divides businesses into different categories, these categories can also be used to classify documents and queries based on the types of businesses to which the documents and queries relate. To create and/or obtain a hierarchy, one can start with a tree that is based on the OSHA taxonomy. Additional categories (e.g., categories that are more specific than those shown in the OSHA tree) can be added in order to augment the tree. Moreover, other taxonomies can be merged into the OSHA tree (or augmented OSHA tree). For example, CityGuide makes available a taxonomy that centers on certain types of retail and service businesses, and this taxonomy can be merged into the OSHA tree to create additional categories in that tree.

At 206, dictionaries are created based on the taxonomy. The dictionaries may represent associations between categories and words. For example, the dictionary may associate the word "hamster" with the category "pet store", or may associate the word "pool" with the categories "swimming" and "billiards". When the taxonomy takes the form of a tree, one way to create a dictionary is to build a list of terms relating to the categories at a given depth-level in the tree and the children of that level (at 252), add any synonyms that may be appropriate (at 254), and group categories that are sufficiently similar (i.e., categories whose differences do not exceed some threshold, however that threshold may be defined) (at 256). While 252-256 show various stages that may be used in building dictionaries, the dictionaries may be built in any manner.

One example of how dictionaries may be created is as follows. Dictionaries may be created from a category tree at several different levels of granularity. In this case, the most fine-grained dictionaries contain categories at the lowest level of the tree. In one example, the tree is composed of a root, plus ten nodes at one level below the root, each corresponding to general industries (e.g., manufacturing, retail, services, etc.). For each of the first level nodes, the leaf nodes below it are taken and built into a list of terms. This gives a fine-grained dictionary that associates terms with categories that are at or near the lowest level in the tree. The leaf nodes may not leaves in the strict sense, but rather may include any nodes that are associated with particular businesses rather than just more specific categories. This may occur, for example, in the case where the OSHA tree is augmented with more specific categories below its lowest depth: The nodes in the lowest depth in the OSHA tree may have businesses associated therewith, and these nodes may also have more specific categories as children. Since the nodes have children, they are not technically "leaf" nodes but may be treated as such for the purpose of gathering terms for the dictionary. These resulting lists of terms are granular dictionaries. Thus, there may be a dictionary that associates terms with categories at any particular level of the tree. For example, there may be one dictionary that associates terms with categories at depth one, another for categories at depth two, and so on. Granular dictionaries may then be curated manually by adding synonyms for each category and grouping different categories whose distinctions are minimal (i.e., distinctions whose differences do not exceed some threshold). The grouping may be done in an automated fashion, and the terms for a group may be the union of the terms for the categories in a particular group. More general (coarse-grained) dictionaries may also be produced, resulting in a smaller number of categories. For example, one can take all nodes in the tree a depth-4, and make categories corresponding to those nodes. The terms associated with that category can then be populated by taking the union of all children of the node from which the category is derived.

The following is another example technique that may be used to build dictionaries. This technique builds dictionaries whose categories have the same level of generality as each other, by assuming that the "generality" of two categories is approximately equal if the number of the businesses in that category is equal. Some threshold number of businesses per category can be established, and a category tree can be walked to find a category at some level that contains a number of businesses that exceed the threshold. From this count of businesses in each category, and by merging categories with small number of businesses together, categories that have roughly equal numbers of businesses (and thus roughly equal presumed generality) can be created. Terms may be associated with each of these categories to create a dictionary.

At 208, documents are tagged to affine them with one or more categories. As noted in the description of 206 above, a category may have one or more terms associated with it. Thus, the terms in the document may be compared with the terms associated with each category. For example, the terms in the documents may be matched against the terms associated with each of the categories. The categories that tag the document may be the category that has the most instances of its synonyms in the document. Other ways of choosing the category (or categories) that tag the document are possible. For example, the n categories that have the most instances of their synonyms in the document could tag the document, in which case a document could affine with plural categories. Or, as yet another example, the top terms ranked by term frequency-inverse document frequency (tf*idf) could be chosen.

At 210, any other stages of process 200 may be performed. Process 200 may result in producing an index that associates one or more categories with each document in a corpus.

When a search engine is to be deployed based on the subject matter described herein, the various indices (text, category, and/or geographic, etc.) may be partitioned and distributed across a cluster of machines, so that each machine hosts a particular slice of the index. In practice, this partitioning would be used to create efficiency and increase the throughput of the system. However, in theory, all indices could be stored on one machine. The subject matter herein can be deployed in any system, regardless of whether the index is hosted on one machine or several machines.

FIG. 3 shows an example process 300 of creating affinity between a query and one or more categories. At 302, the query may be sent to a distributed aggregator. In the case where slices of the indices are hosted on different machines, a distributed aggregator may be used to forward the query to these various machines (at 304).

At 306, the query is matched with documents based on terms. Any form of lemmatization (e.g., stemming, case folding, compound word normalization, etc.) may be used, so that a query and a document can match even if they use different forms of the same word. This match may be performed by comparing the terms in the query with the text index of documents to determine which documents contain the terms of the query. In one example, this match looks for documents that contain all the words in the query (or their stems), but other forms of matching are possible (e.g., the query could specify some or all of its terms in the alternative, in which case the match would look for documents that contain at least one of the alternative terms). Scores may be generated for the matching documents, based on how well a particular document matches the query in the text/word-based search.

At 308, the number of documents in each category is tallied. In one example implementation, the number of documents in each category is counted in advance and stored, rather than being calculated at the time each query is processed, since the affinities between the categories and the documents are relatively static. (These affinities can change, for example, if the taxonomy is changed, or if the documents change, or if new documents are added to the index, but it is not necessary to know, at the time the query is processed, the exact number of documents in each category at that moment.)

At 310, the number of documents that match the query is tallied. At 312, the number of documents that match the query and the category is tallied.

At 314, the degree of statistical surprisingness of association between the query and the category is calculated. The surprisingness may be used to make an evaluation of the query's likelihood of matching the category, as compared to the query's random chance of matching the category. In one example, this calculation may be made by computing the number of documents matching the query and each category, and then comparing the actual number of co-occurrences on the corpus between the query and category with the expected number of co-occurrences. Surprisingness may be understood as the observed level of matching the query with the concept, as compared with that which would be expected by random chance if the query and concept were independent of each other at a document level. (This is one, non-limiting example of a class of computation that can be done which relates the query and the concept using the scoring information from the previous stages.) Categories that fail certain quality thresholds (e.g., where the number of documents matching query/category falls between a certain threshold, etc.) may be excluded from the results and from this calculation. The amount of statistical surprisingness may be normalized by a curve which may be generated by plotting points for many query-concept pairs, hand-labeling pairs as related and non-related, and finding a function which optimally separates the two. This curve may depend on the expected number of co-occurrences between the category and query, as its variability is much higher when this expected intersection is low.

Scores may be generated based on the category match, which represent how well a particular document matches the query under the category-based search.

Figure 4:
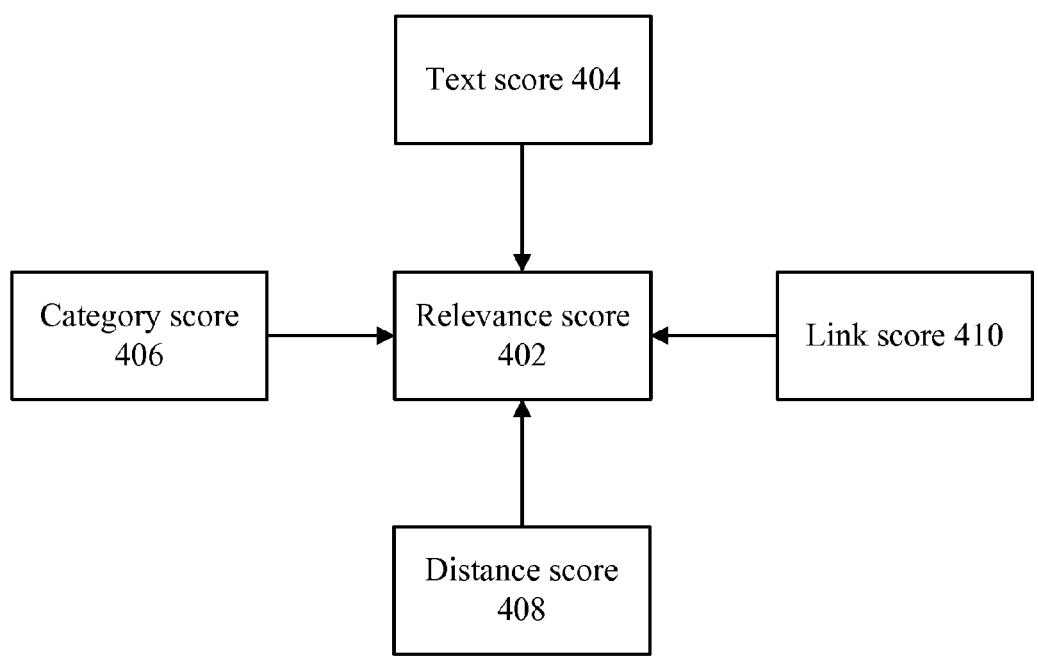
FIG. 4 is a block diagram of a relevance score and various example factors that may contribute to the relevance score.

In order to provide search results, total relevance scores for the documents may be generated. FIG. 4 shows an example of various components that contribute to a relevance score.

Relevance score 402 is a score that may be assigned to each document, and used to generate ordered search results. For example, a search engine may present results 1 through n, where the first search result is the document that received the highest relevance score, the second result is the document that received the second highest relevance score, etc. These relevance scores may be generated based on various factors. For example, relevance score 402 may be based on a text score 404, a category score 406, a distance score 408, and/or a link score 410. In addition to these factors, other factors may be used.

Text score 404 represents a document's score against a query based on a text/word search. For example, documents may be scored based on how frequently the words in a query appear in a document, how well the words the query correlate with a document, etc.

Category score 406 represents a document's score against a query based on a category comparison. As discussed above, there may be a taxonomy of categories, and documents and queries may each be affined with categories in this taxonomy. The category score may be generated based on the extent to which a query's category affinity(ies) are similar to a documents category affinity(ies).

Distance score 408 is based on the relative geographic locations implied by a query and a document. Documents may be associated with a particular location (e.g., a document could be associated with a particular restaurant located at a particular point on the map; this point on the map may be the location implied by the document). Similarly, a query may be associated with a particular geographic location—e.g., a query that contains the United States Zip Code 94041 may be associated with a point in downtown Mountain View, Calif. A document's distance score 408 is based on how far the geographic location associated with the document is from the geographic location associated with the query.

Link score 410 may be based on the number and/or quality of links to a document that is being scored. For example, link score 410 for a particular document may be based on the number of inbound links to the document. As another example, link score 410 may take into account some measure of the relevance of the linking (or "referring") document to the linked document. For example, if document A links to document B, link score 410 may take into account whether documents A and B have words/terms in common, or have categories in common. This commonality may be taken as an indication of the document A's relevance to document B, and a link for document A to document B may contribute a greater amount or a lesser amount to document B's link score depending on how relevant document A is to document B. (E.g., document A's link to B may contribute more to document B's link score if document A is particularly relevant to document B.)

The text score 404, category score 406, distance score 408, and/or link score 410 (as well as any other scores) for a particular document may be combined using some formula—e.g., the score may be added, and each score could be multiplied by a weight to determine its relative importance in the final relevance score 402. The relevance score 402 may then be used to create the document ranking in search results.

Figure 5:
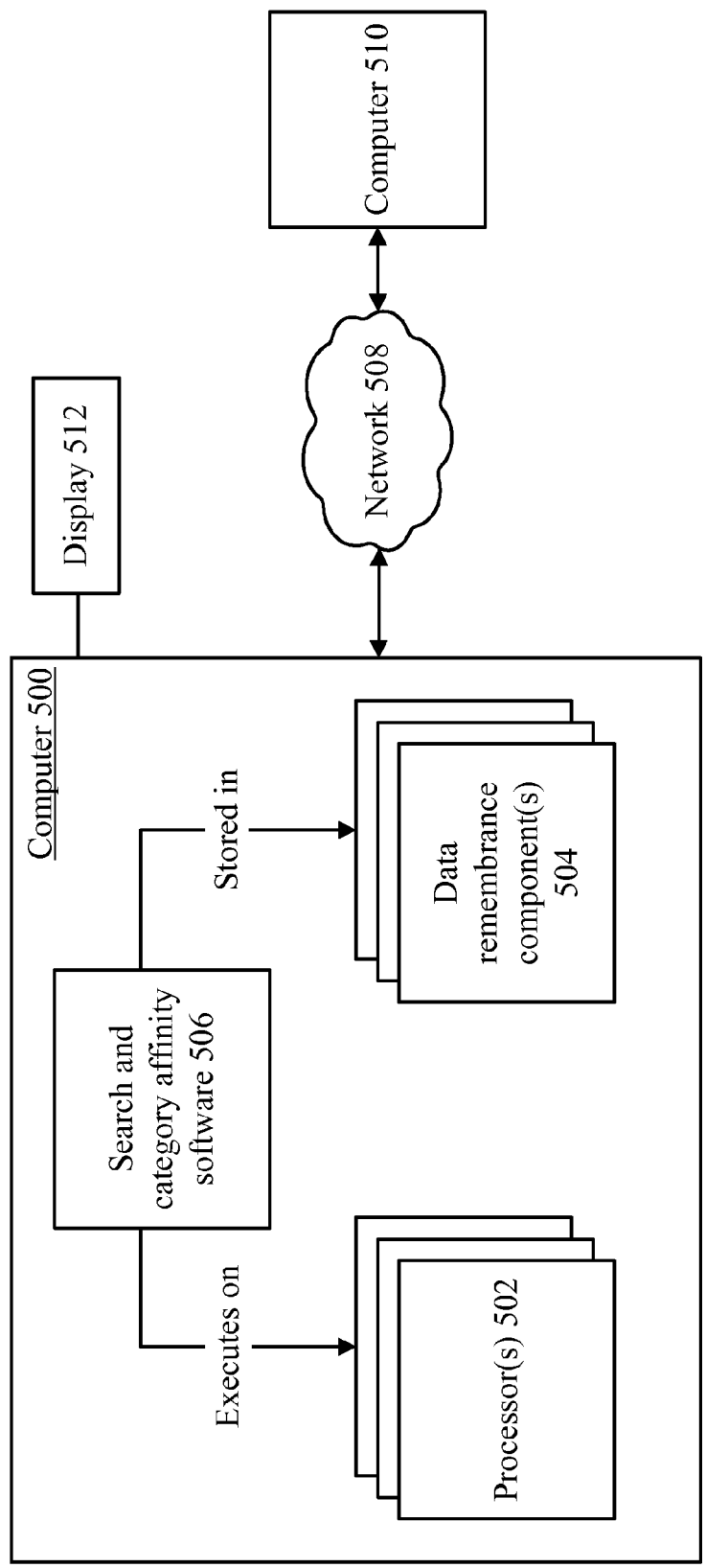
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is search and category affinity software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as software having instructions to perform one or more acts, where the instructions are stored on one or more computer-readable storage media.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of providing search results in response to a query, the method comprising:
    obtaining, by a computer system, access to a corpus comprising a plurality of documents;
    characterizing, by the computer system after the obtaining, a document of the plurality of documents by selecting one or more first categories from a hierarchal category tree that are reflected in the document and assigning in memory of the computer system the one or more first categories to the document, the hierarchal category tree comprising a taxonomy of different business categories;
    receiving, by the computer system after the assigning, a query;
    identifying, by the computer system after the receiving, one or more second categories from the hierarchal category tree that are reflected in the query;
    generating, by the computer system, a plurality of scores comprising
        a category score quantifying how similar the one or more first categories are to the one or more second categories,
        a text score quantifying how frequently one or more words in the query appear in the document, and
        a relevance score comprising a combination of the category score and the text score made according to a mathematic formula;
    using, by the computer system after the generating, the relevance score to rank the document within search results corresponding to the query; and
    displaying the search results on a display forming part of the computing system.

2. The method of claim 1, wherein:
each of the one or more first categories is associated with one or more words; and
the characterizing comprises selecting, as the one or more first categories, one or more categories of the hierarchal category tree that are associated with more words found in the document than a remainder of the categories of the hierarchal category tree.

3. The method of claim 1, wherein:
the plurality of scores further comprises a link score quantifying a number, a quality, or the number and the quality of links within a computer network to the document; and
the relevance score comprises a combination of the category score, the text score, and the link score made according to the mathematic formula.

4. The method of claim 1, wherein:
the document is associated with a first geographic location;
the query comprises an indication of a second geographic location; and
the plurality of scores further comprises a distance score characterizing a distance between the first geographic location and the second geographic location; and
the relevance score comprises a combination of the category score, the text score, and the distance score made according to the mathematic formula.

5. The method of claim 4, wherein:
the plurality of scores further comprises a link score quantifying a number, a quality, or the number and the quality of links within a computer network to the document; and
the relevance score comprises a combination of the category score, the text score, the distance score, and the link score made according to the mathematic formula.

6. The method of claim 1, further comprising creating a taxonomy that includes the one or more first categories and the one or more second categories, wherein each category in the taxonomy is associated with one or more features.

7. The method of claim 6, wherein the characterizing comprises determining, for the document, one or more categories associated with features that appear in the document.

8. The method of claim 1, further comprising:
creating at least one dictionary that comprises a plurality of words and that associates each word of the plurality of words with one or more categories; and
wherein selecting the one or more first categories comprises comparing words in the document with words in the at least one dictionary.

9. The method of claim 8, wherein the at least one dictionary comprises:
a first dictionary associating words with categories at a first level of granularity within the hierarchal category tree; and
a second dictionary associating words with categories at a second level of granularity within the hierarchal category tree.

10. The method of claim 8, wherein:
each category of the hierarchal category tree corresponds to a business providing a particular type or set of goods or services; and
each category of the hierarchal category tree is placed at a particular level within the hierarchal category tree based an approximate number of businesses corresponding to that category.

11. The method of claim 1, wherein:
each category of the hierarchal category tree corresponds to a business providing a particular type or set of goods or services; and
each category of the hierarchal category tree is placed at a particular level within the hierarchal category tree based an approximate number of businesses corresponding to that category.

12. A method of providing search results in response to a query, the method comprising:
obtaining, by a computer system, access to a corpus comprising a plurality of documents;
obtaining, by the computer system, access to at least one dictionary correlating one or more words to each category of a hierarchal category tree, the hierarchal category tree comprising a taxonomy of different business categories;
characterizing, by the computer system after the obtaining, a document of the plurality of documents by
selecting one or more first categories from a hierarchal category tree that are correlated in the at least one dictionary to one or more words found in the document and
assigning in memory of the computer system the one or more first categories to the document;
receiving, by the computer system after the assigning, a query;
identifying, by the computer system after the receiving, one or more second categories from the hierarchal category tree that are correlated in the at least one dictionary to one or more words in the query;
generating, by the computer system, a plurality of scores comprising
a category score quantifying how similar the one or more first categories are to the one or more second categories,
a text score quantifying how frequently one or more words in the query appear in the document,
a link score quantifying a number, a quality, or the number and the quality of links within a computer network to the document, and
a relevance score comprising a combination of the category score, the text score, and the link score made according to a mathematic formula; and
using, by the computer system after the generating, the relevance score to rank the document within search results corresponding to the query.

13. The method of claim 12, wherein each category of the hierarchal category tree corresponds to a business providing a particular type or set of goods or services.

14. The method of claim 12, wherein:
the document is associated with a first geographic location;
the query comprises an indication of a second geographic location;
the plurality of scores further comprises a distance score characterizing a distance between the first geographic location and the second geographic location; and
the relevance score comprises a combination of the category score, the text score, the link score, and the distance score made according to the mathematic formula.

15. A method of providing search results in response to a query, the method comprising:
obtaining, by a computer system, access to a corpus comprising a plurality of documents;
obtaining, by the computer system, access to a taxonomy of different business categories, the taxonomy forming a hierarchal category tree wherein each category of the hierarchal category tree corresponds to a business providing a particular type or set of goods or services;

characterizing, by the computer system after the obtaining, a document of the plurality of documents by
　selecting one or more first categories from the taxonomy of different business categories that are reflected in the document and
　assigning in memory of the computer system the one or more first categories to the document;
receiving, by the computer system after the assigning, a query;
identifying, by the computer system after the receiving, one or more second categories from the taxonomy of different business categories that are reflected in the query;
generating, by the computer system, a plurality of scores comprising
　a category score quantifying how similar the one or more first categories are to the one or more second categories,
　a text score quantifying how frequently one or more words in the query appear in the document, and
　a relevance score comprising a combination of the category score and the text score made according to a mathematic formula; and
using, by the computer system after the generating, the relevance score to rank the document within search results corresponding to the query.

16. The method of claim 15, wherein:

the plurality of scores further comprises a link score quantifying a number, a quality, or the number and the quality of links within a computer network to the document; and the relevance score comprises a combination of the category score, the text score, and the link score made according to the mathematic formula.

\* \* \* \* \*